United States Patent
Wert et al.

(10) Patent No.: US 11,634,803 B2
(45) Date of Patent: Apr. 25, 2023

(54) QUENCH AND TEMPER CORROSION RESISTANT STEEL ALLOY AND METHOD FOR PRODUCING THE ALLOY

(71) Applicant: CRS HOLDINGS, INC., Wilmington, DE (US)

(72) Inventors: David E. Wert, Wyomissing, PA (US); Samuel J. Kernion, Lancaster, PA (US); Shane Para, Downingtown, PA (US); Karl Heck, West Lawn, PA (US)

(73) Assignee: CRS HOLDINGS, LLC, Wilmington, DE (US)

( * ) Notice: Subject to any disclaimer, the term of this patent is extended or adjusted under 35 U.S.C. 154(b) by 545 days.

(21) Appl. No.: 16/666,700

(22) Filed: Oct. 29, 2019

(65) Prior Publication Data

US 2020/0063247 A1 Feb. 27, 2020

Related U.S. Application Data

(63) Continuation-in-part of application No. 15/235,226, filed on Aug. 12, 2016, now Pat. No. 10,458,007, which is a continuation of application No. 14/061,845, filed on Oct. 24, 2013, now abandoned.

(60) Provisional application No. 61/717,877, filed on Oct. 24, 2012.

(51) Int. Cl.

| | |
|---|---|
| C22C 38/52 | (2006.01) |
| C21D 9/00 | (2006.01) |
| B64C 25/00 | (2006.01) |
| B64C 9/02 | (2006.01) |
| B22F 1/00 | (2022.01) |
| C22C 38/48 | (2006.01) |
| C22C 38/06 | (2006.01) |
| C22C 38/00 | (2006.01) |
| C22C 38/50 | (2006.01) |
| C22C 38/46 | (2006.01) |
| C22C 38/44 | (2006.01) |
| C22C 38/42 | (2006.01) |
| C22C 38/04 | (2006.01) |
| C22C 38/02 | (2006.01) |
| C21D 1/18 | (2006.01) |
| C21D 8/00 | (2006.01) |
| C21D 6/00 | (2006.01) |
| C21D 6/04 | (2006.01) |
| C21D 7/13 | (2006.01) |

(52) U.S. Cl.
CPC ............ *C22C 38/52* (2013.01); *B22F 1/0003* (2013.01); *B64C 9/02* (2013.01); *B64C 25/00* (2013.01); *C21D 1/18* (2013.01); *C21D 6/004* (2013.01); *C21D 8/005* (2013.01); *C21D 9/0075* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C21D 6/04* (2013.01); *C21D 7/13* (2013.01); *C21D 2211/004* (2013.01); *C21D 2211/008* (2013.01)

(58) Field of Classification Search
CPC .................................................. C22C 38/52
See application file for complete search history.

(56) References Cited

U.S. PATENT DOCUMENTS

| | | |
|---|---|---|
| 3,663,208 A | 5/1972 | Kirby et al. |
| 5,650,024 A | 7/1997 | Hasegawa et al. |
| 6,030,469 A | 2/2000 | Ernst et al. |
| 6,117,388 A | 9/2000 | Shibata et al. |
| 6,187,261 B1 | 2/2001 | Fedchun |
| 6,193,469 B1 | 2/2001 | Tsuda et al. |
| 6,426,038 B1 | 7/2002 | Fedchun |
| 6,426,040 B1 | 7/2002 | Fedchun |

(Continued)

FOREIGN PATENT DOCUMENTS

| | | |
|---|---|---|
| EP | 0411931 | 2/1991 |
| EP | 0867522 A2 | 9/1998 |

(Continued)

OTHER PUBLICATIONS

International Search Report, PCT/US2013/066496, dated Feb. 5, 2014, 5 pages.

(Continued)

*Primary Examiner* — Christopher S Kessler
(74) *Attorney, Agent, or Firm* — Dann, Dorfman, Herrell and Skillman, P.C.

(57) ABSTRACT

A quench and temper steel alloy is disclosed having the following composition in weight percent.

| | |
|---|---|
| C | 0.1-0.4 |
| Mn | 0.1-1.0 |
| Si | 0.1-1.2 |
| Cr | 9.0-12.5 |
| Ni | 3.0-4.3 |
| Mo | 1-2 |
| Cu | 0.1-1.0 |
| Co | 1-4 |
| W | 0.2 max. |
| V | 0.1-0.6 |
| Ti | 0.1 max. |
| Nb | up to 0.01 |
| Ta | up to 0.01 |
| Al | 0-0.25 |
| N | 0.1-0.35 |
| Ce | 0.006 max. |
| La | 0.006 max. |

The balance of the alloy is iron and the usual impurities found in similar grades of quench and temper steels intended for similar use or service, including not more than about 0.01% phosphorus and not more than about 0.010% sulfur.

(Continued)

A quenched and tempered steel article made from this alloy is also disclosed. Further disclosed is a method of making the alloy.

18 Claims, 6 Drawing Sheets

(56) References Cited

U.S. PATENT DOCUMENTS

| | | | |
|---|---|---|---|
| 6,899,773 B2 | 5/2005 | Buck | |
| 7,067,019 B1 | 6/2006 | Fedchun et al. | |
| 7,160,399 B2 | 1/2007 | Kuehmann et al. | |
| 8,071,017 B2 | 12/2011 | Fedchun et al. | |
| 8,361,247 B2 | 1/2013 | Vartanov | |
| 10,094,007 B2 | 10/2018 | Wert et al. | |
| 2005/0126662 A1 | 6/2005 | Cao | |
| 2009/0196784 A1 | 8/2009 | Fedchun et al. | |
| 2014/0140883 A1* | 5/2014 | Wert | C22C 38/46 420/61 |

FOREIGN PATENT DOCUMENTS

| | | |
|---|---|---|
| EP | 0867523 A1 | 9/1998 |
| EP | 1466993 A1 | 10/2004 |
| GB | 796733 | 6/1958 |
| GB | 1250898 A | 10/1971 |
| GB | 2288188 | 10/1995 |
| WO | 03018856 A2 | 3/2003 |
| WO | 2010044740 A1 | 4/2010 |
| WO | 2014066570 A1 | 5/2014 |

OTHER PUBLICATIONS

Written Opinion of ISA, PCT/US2013/066496, dated Feb. 5, 2013, 9 pages.

Lee, E.U. et al., "Aircraft Steels," Unclassified Report No. NAWCADPAX/TR-2009/12, Feb. 19, 2009, pp. 1-15.

Technical Data Sheet, Ferrium S53 Corrosion Resistant Ultrahigh-Strength Steel for Aerospace Structural Applications, Ques Tek Innovations LLC, Mar. 2010 (2 pages).

* cited by examiner

QUENCH AND TEMPER CORROSION RESISTANT STEEL ALLOY AND METHOD FOR PRODUCING THE ALLOY

BACKGROUND OF THE INVENTION

Field of the Invention

This invention relates generally to steel alloys that provide very high strength in combination with good toughness in the quenched and tempered condition and in particular to such a steel alloy that also provides good corrosion resistance.

Description of the Related Art

Aircraft landing gear are critical components that are highly stressed and subject to adverse environmental conditions in use. Steel alloys such as AISI 4340 and the 300M alloy have long been used to make landing gear for aircraft because those alloys can be quenched and tempered to provide very high strength (ultimate tensile strength of at least 280 ksi) in combination with fracture toughness ($K_{Ic}$) of at least 50 ksi√in. However, neither of those alloys provides effective corrosion resistance. Therefore, it has been necessary to plate the landing gear components with a corrosion resistant metal such as cadmium. Cadmium is a highly toxic, carcinogenic material and its use has presented significant environmental risks in the manufacture and maintenance of aircraft landing gear and other components made from these alloys.

A known alloy that is sold under the registered trademark FERRIUM® S53 was developed to provide a combination of strength and toughness similar to that provided by the 4340 and 300M alloys and to also provide corrosion resistance. The FERRIUM S53 alloy was designed to overcome the problems associated with using cadmium plating to provide adequate corrosion resistance in aircraft landing gear made from either the 4340 alloy or the 300M alloy. However, the FERRIUM S53 alloy includes a significant addition of cobalt which is a rare and thus, expensive element. In order to avoid the much higher cost of using the FERRIUM S53 for the landing gear application, attempts have been made to develop a quench and temper steel alloy that provides the strength, toughness, and corrosion resistance attributed to the FERRIUM S53 alloy, but without the addition of costly cobalt.

Cobalt-free martensitic steel alloys that can be quenched and tempered to provide strength and toughness comparable to the FERRIUM S53 alloy and which also provide corrosion resistance are described in U.S. Pat. No. 8,071,017 and in U.S. Pat. No. 8,361,247. However, it has been found that the corrosion resistance provided by those steels leaves something to be desired. Enhanced corrosion resistance is especially important for aircraft landing gear because they are exposed to many different types of corrosive environments, some of which are more aggressive than others at causing corrosion in steel. Accordingly, there is a need for a steel alloy that provides the very high strength and toughness needed for the landing gear application, that provides better corrosion resistance than the known corrosion resistant quench and temper steels, and that can be produced at a discount in price relative to steels that contain a substantial amount of cobalt.

The alloy described in U.S. nonprovisional patent application Ser. No. 15/235,226 is a corrosion resistant, martensitic steel alloy that can be quenched and tempered to provide a tensile strength of at least about 280 ksi and a fracture toughness ($K_{Ic}$) of at least about 65 ksi√in. An article made from that steel is further characterized by having good resistance to general corrosion as determined by the salt spray test (ASTM B 117) and good resistance to pitting corrosion as determined by the cyclic potentiodynamic polarization method (ASTM G61 Modified). However, when that alloy was produced in commercial-size ingots, it was found that the alloy was subject to quench-rate sensitivity. In other words, when an ingot is cooled from the austenitizing temperature at a cooling rate that is slower than oil quenching, carbides precipitate at the alloy grain boundaries. The grain boundary carbides adversely affect the toughness provided by the alloy.

SUMMARY OF THE INVENTION

The quench-rate sensitivity problem described above is resolved to a large degree by a quench-and-temper alloy in accordance with the present invention. In accordance with one aspect of the present invention, there is provided a high strength, high toughness, corrosion resistant steel alloy that has the following broad and preferred weight percent compositions.

|    | Broad      | Preferred  |
|----|------------|------------|
| C  | 0.1-0.4    | 0.15-0.30  |
| Mn | 0.1-1.0    | 0.1-0.7    |
| Si | 0.1-1.2    | 0.5-1.2    |
| Cr | 9.0-12.5   | 9.5-12.5   |
| Ni | 3.0-4.3    | 3.2-4.3    |
| Mo | 1-2        | 1.25-1.75  |
| Cu | 0.1-1.0    | 0.1-0.7    |
| Co | 1-4        | 2-3        |
| W  | 0.2 max.   | 0.1 max.   |
| V  | 0.1-0.6    | 0.1-0.5    |
| Ti | 0.1 max.   | 0.02 max.  |
| Nb | 0-0.01     | 0.01 max.  |
| Ta | 0-0.01     | 0.01 max.  |
| Al | 0.25 max.  | 0.25 max.  |
| N  | 0.1-0.35   | 0.15-0.30  |
| Ce | 0.006 max. | 0.006 max. |
| La | 0.006 max. | 0.005 max. |

The balance of the alloy is iron and the usual impurities found in similar grades of quench and temper steels intended for similar use or service, including not more than about 0.01% phosphorus and not more than about 0.050% sulfur. Preferably, the combined amount of carbon and nitrogen (% C+% N) in the alloy is about 0.3-0.6.

The foregoing tabulation is provided as a convenient summary and is not intended to restrict the lower and upper values of the ranges of the individual elements for use in combination with each other, or to restrict the ranges of the elements for use solely in combination with each other. Thus, one or more of the ranges can be used with one or more of the other ranges for the remaining elements. In addition, a minimum or maximum for an element of the broad ranges can be used with the minimum or maximum for the same element in the preferred ranges, and vice versa. Moreover, the alloy according to the present invention may comprise, consist essentially of, or consist of the constituent elements described above and throughout this application. Here and throughout this specification the term "percent" or the symbol "%" means percent by weight or mass percent, unless otherwise specified.

In accordance with another aspect of the present invention, there is provided a quenched and tempered steel article that is made from either of the steel alloy compositions set forth above. The steel article is characterized by having a tensile strength of at least about 260 ksi and a fracture toughness ($K_{Ic}$) of at least about 40 ksi/in. The steel article is further characterized by having good resistance to general corrosion as determined by the salt spray test (ASTM B 117) and good resistance to pitting corrosion as determined by the cyclic potentiodynamic polarization method (ASTM G61).

In accordance with a further aspect of the invention, there is provided a method of producing a stainless steel alloy that can be quenched and tempered to provide a tensile strength of at least about 280 ksi and that substantially avoids the formation of carbides at the alloy grain boundaries when the alloy is cooled from its austenitizing temperature at a cooling rate less than the cooling rate provided by oil quenching. The method includes the steps of casting an alloy having a weight percent composition as described above except for nitrogen and then electroslag remelting the alloy under a superatmospheric pressure of nitrogen gas whereby the remelted alloy includes about 0.1% to about 0.35% nitrogen.

BRIEF DESCRIPTION OF THE DRAWINGS

The as-quenched microstructures of examples of the alloy according to the present invention are illustrated in the accompanying drawings, wherein.

DETAILED DESCRIPTION

At least about 0.1% and preferably at least about 0.15% carbon is present in this alloy. Carbon combines with iron to form an Fe—C martensitic structure that benefits the high hardness and strength provided by the alloy. Carbon also forms carbides with molybdenum, vanadium, titanium, niobium, and/or tantalum that further strengthen the alloy during tempering. The carbides that form in the present alloy are predominantly MC-type carbides, but some $M_2C$, $M_6C$, $M_7C_3$, and $M_{23}C_6$ carbides may also be present. Too much carbon adversely affects the toughness and ductility provided by this alloy. Too much carbon also adversely affects the alloy's corrosion resistance because it increases grain boundary sensitivity, i.e., the formation of chromium carbides at the grain boundaries when the alloy is processed at certain temperatures. The formation of the chromium carbides depletes chromium from the matrix material, thereby increasing the likelihood of corrosive attack in the chromium-depleted region. Therefore, carbon is restricted to not more than about 0.4%, better yet to not more than about 0.35%, and preferably to not more than about 0.30%.

At least about 0.1% nitrogen is present in this alloy to benefit the hardness and strength provided by the alloy particularly when the alloy contains less than about 0.25% carbon. It is believed that nitrogen benefits the corrosion resistance provided by the alloy because the presence of nitrogen in the alloy permits the use of a lesser amount of carbon to obtain the desired level of strength. The reduction in carbon content compared to the known alloy reduces the likelihood of grain boundary sensitivity as described. Preferably, the alloy contains at least about 0.15% nitrogen. Too much nitrogen adversely affects the toughness and ductility provided by the alloy because it forms metal nitrides in the alloy matrix. Accordingly, the alloy contains not more than about 0.35% nitrogen and preferably not more than about 0.30% nitrogen. In order to ensure that the alloy provides the desired level of tensile strength and toughness, the alloy preferably contains about 0.3% to about 0.6% carbon-plus-nitrogen (C+N).

The alloy according to this invention contains at least about 9% chromium to benefit the corrosion resistance and hardenability of the alloy. Preferably, the alloy contains at least about 9.5% chromium. Too much chromium in the alloy adversely affects the toughness and ductility provided by the alloy. Therefore, the alloy preferably contains not more than about 12.5% chromium.

Nickel is beneficial to the toughness and ductility provided by the alloy according to this invention. Therefore, the alloy contains at least about 3.0% nickel and preferably at least about 3.2% nickel. In order to limit the upside cost of the alloy, the amount of nickel is restricted to not more than about 4.3%.

Molybdenum is a carbide forming element that forms $M_6C$ and $M_{23}C_6$ carbides that are beneficial to the temper resistance provided by this alloy. Molybdenum also contributes to the strength and fracture toughness provided by the alloy. Furthermore, molybdenum contributes to the pitting corrosion resistance provided by the alloy. The benefits provided by molybdenum are realized when the alloy contains at least about 1% molybdenum and preferably at least about 1.25% molybdenum. Like nickel, molybdenum does not provide an increasing advantage in properties relative to the increased cost of adding larger amounts of molybdenum. For that reason, the alloy contains not more than about 2% molybdenum and preferably not more than about 1.75% molybdenum.

The alloy of this invention contains a positive addition of cobalt to benefit the strength and toughness provided by the alloy. Cobalt also benefits the temper resistance of the alloy in a manner similar to molybdenum. Unexpectedly, cobalt appears to be beneficial for the corrosion resistance provided by the alloy. For these reasons, the alloy contains at least about 1% cobalt and preferably at least about 2% cobalt. Cobalt is a rare and thus, very expensive element. Therefore, in order to obtain the benefits of cobalt in this alloy and yet maintain a cost advantage relative to other high strength steel alloys that contain 6% or more cobalt, this alloy contains not more than about 4% cobalt. Preferably, the alloy contains not more than about 3% cobalt.

Vanadium combines with some of the carbon to form MC-type carbides that limit the grain size which in turn benefits the strength and toughness provided by the alloy according to this invention. The MC-type carbides formed by vanadium in this alloy also benefit the temper resistance and secondary hardening of the alloy. Therefore, the alloy contains at least about 0.1% vanadium. Too much vanadium adversely affects the strength of the alloy because of the formation of larger amounts of carbides in the alloy that deplete carbon from the martensitic matrix material. Accordingly, vanadium is restricted to not more than about 0.6% and preferably to not more than about 0.5% in this alloy.

At least about 0.1%, manganese may be present in this alloy primarily from deoxidizing additions during primary melting of the alloy. Manganese also increases the solubility limit of nitrogen in the alloy so that more nitrogen can be retained in the alloy. It is believed that manganese may also benefit the high strength provided by the alloy. If too much manganese is present, then an undesirable amount of retained austenite may remain after quenching such that the high strength provided by the alloy is adversely affected. Therefore, the alloy contains not more than about 1.0% and preferably not more than about 0.7% manganese.

Silicon benefits the hardenability and temper resistance of this alloy. Therefore, the alloy contains at least about 0.1% silicon and preferably at least about 0.05% silicon. Too much silicon adversely affects the hardness, strength, and ductility of the alloy. In order to avoid such adverse effects silicon is restricted to not more than about 1.2% and preferably to not more than about 1.0% in this alloy.

Copper is present in this alloy because it contributes to the hardenability, toughness, and ductility of the alloy. Copper may also benefit the alloy's machinability and corrosion resistance. The alloy preferably contains at least about 0.1% and better yet at least about 0.3% copper. The inventors have discovered that copper and nickel should be balanced in this alloy, particularly when the alloy contains low amounts of copper. Thus, when the alloy contains less than 0.1% copper, for example, not more than about 0.01% copper, at least about 3.75% and preferably not more than about 4.0% nickel should be present to ensure that the desired combination of strength, toughness, and ductility are provided. Too much copper can result in precipitation of an undesirable amount of free copper in the alloy matrix and adversely affect the fracture toughness of the alloy. Therefore, when copper is present in the alloy, copper is restricted to not more than about 1.0% and preferably to not more than about 0.7%.

Tungsten is a carbide forming element which, like molybdenum, contributes to the hardness and strength of this alloy when present. A small amount of tungsten, up to about 0.2% may be present in this alloy in substitution for some of the molybdenum. However, tungsten does not appear to benefit the corrosion resistance of the alloy. Therefore, the alloy preferably contains not more than about 0.1% tungsten.

Niobium and tantalum are carbide forming elements that combine with carbon to form $M_4C_3$ carbides that benefit the temper resistance and hardenability of the alloy. In order to avoid the formation of excessive amounts of carbides, the alloy preferably contains not more than about 0.01% of niobium and/or tantalum.

Titanium is limited to not more than about 0.1% in this alloy because it forms titanium nitrides and titanium carbonitrides that adversely affect the fracture toughness and tensile ductility provided by the alloy, particularly in the transverse direction. Preferably, titanium is limited to not more than about 0.02%, and better yet to not more than about 0.01% in this alloy.

Up to about 0.25% aluminum may be present in the alloy from deoxidation additions during melting. Preferably, the alloy contains not more than about 0.01% aluminum.

Up to about 0.01% of cerium and/or lanthanum may be present in this alloy as a result of misch metal additions during primary melting. The misch metal addition benefits the toughness of the alloy by combining with sulfur and or oxygen in the alloy, thereby limiting the size and shape of sulfide- and oxysulfide-inclusions that may be present. Preferably, the alloy contains not more than about 0.006% cerium and not more than about 0.005% lanthanum from such additions.

The balance of the alloy is iron and the usual impurities found in known grades of steels intended for similar purpose or service. In this regard, phosphorus is restricted to not more than about 0.01% and preferably to not more than about 0.005% in this alloy. Sulfur is restricted to not more than about 0.001% in this alloy and preferably to not more than about 0.0005%.

The alloy according to this invention can be prepared by vacuum induction melting (VIM) under a subatmospheric pressure of nitrogen gas. When more than about 0.15% nitrogen is needed in the alloy to provide higher strength, a pressurized ESR (PESR) process is preferably used after VIM. In order to ensure the retention of 0.15% or more nitrogen in the alloy, the PESR is carried out under a superatmospheric pressure of nitrogen. Silicon nitride is preferably added to the melt during PESR.

For cast/wrought product forms of the alloy, the ESR ingot is preferably given a homogenization heat treatment after removal from the mold. The homogenization is preferably carried out by heating the ingot at about 2200° F. to about 2375° F. for about 9 to 18 hours depending on the size of the ingot. The ingot is then hot worked to a billet having a smaller cross-sectional area. The billet is further hot worked such as by forging or rolling to provide an intermediate product form having a desired cross-section dimension and shape, for example, round or square bar. The intermediate product form is preferably normalized by heating the alloy under temperature and time conditions sufficient to dissolve Cr-rich carbides that may have precipitated during solidification. Preferably, the intermediate product is normalized by heating at about 1925-2050° F. for about 2 to 8 hours. The alloy is then annealed by further heating the alloy at about 1100-1250° F. for about 2 to 12 hours. This low annealing temperature helps to keep the dissolved chromium carbides in solution. The alloy is preferably formed into final or near-final product forms in the annealed condition. Final product forms made from the alloy are hardened by heating the alloy at a temperature of about 1950-2050° F., preferably at about 2000° F., for a time sufficient to fully austenitize the alloy and to dissolve most, preferably all, of the remaining chromium carbides so that the amount of chromium present in the alloy matrix can be maximized. The alloy is then preferably oil quenched from the austenitizing temperature. However, the alloy can be cooled at slower rates if desired, for example, by gas quenching or air cooling, without any significant precipitation of carbides at the grain boundaries. To ensure a substantially full transformation to a martensitic structure and minimize the presence of retained austenite, the alloy is preferably deep chilled at about −100° F. for at least about 1 hour and then warmed in air. The alloy is then tempered to final hardness by heating at about 350-550° F., preferably at about 400° F., for 1-6 hours, and then cooled to room temperature. The tempering temperature is selected to maximize toughness while minimizing the re-precipitation of chromium carbides in the alloy.

In the quenched and tempered condition, the alloy comprises a dispersion of carbides as discussed above in the Fe—C martensitic matrix. The carbides present in the alloy and articles made therefrom are predominantly, if not entirely, greater than 10 nm in major cross-sectional dimension. Preferably, the heat-treating parameters are controlled so that the carbide size is not greater than about 15 μm in major cross-sectional dimension.

A steel article made from the alloy described above and processed in accordance with the foregoing processing steps provides a combination of properties that make it particularly useful for aircraft landing gear and other aeronautical or aerospace structural components, including but not limited to flap tracks, slat tracks, rotating shafts, and actuators, and for other applications where the non-corrosion resistant steels 300M and 4340 are currently used. In particular, a steel article fabricated from the alloy that is hardened and tempered as set forth above provides a tensile strength of at least 260 ksi, preferably at least 280 ksi, and a fracture toughness ($K_{Ic}$) of at least 40 ksi√in when tested with a test machine that meets the requirements of ASTM Standard Test Procedure E1290. Further, a steel article in accordance with this invention is characterized by general corrosion resistance such that the article does not rust when tested in accordance with ASTM Standard Test Procedure B 117 and by sufficient pitting corrosion resistance such that the article has a pitting potential of at least 90 mV when tested in accordance with ASTM Standard Test procedure G61.

WORKING EXAMPLES

In order to demonstrate the novel combination of strength, ductility, toughness, and corrosion resistance provided by the alloy according to this invention, testing programs were carried out as described in the following examples.

Example 1—Low Nitrogen

Three heats evaluated in this project were melted as 35-lb. laboratory heats. The weight percent compositions and heat numbers of these heats are shown in Table 1.

TABLE 1

| Elmt. | 780 | 781 | 782 |
|---|---|---|---|
| C | 0.22 | 0.24 | 0.27 |
| Mn | 0.50 | 0.50 | 0.50 |
| Si | 0.94 | 0.94 | 0.94 |
| P | <0.005 | <0.005 | <0.005 |
| S | 0.0012 | 0.0005 | 0.0008 |
| Cr | 9.94 | 9.91 | 9.93 |
| Ni | 3.49 | 3.54 | 3.50 |
| Mo | 1.50 | 1.50 | 1.50 |
| Cu | 0.50 | 0.49 | 0.50 |
| Co | 2.49 | 2.50 | 2.49 |
| V | 0.49 | 0.50 | 0.49 |
| Ti | 0.04 | 0.07 | 0.04 |
| N | 0.11 | 0.10 | 0.11 |

The balance of each alloy was iron and usual impurities.

The heats were vacuum melted and cast into 4-in. square ingot molds. The ingots were air cooled, stress relieved at 1150° F. for 3 hours, and then cooled in air. The ingots were charged into a furnace running at 1200° F. The furnace temperature was ramped up to 1600° F. and held at that temperature until the ingots equalized in temperature. The furnace temperature was then ramped up to 2350° F. The ingots were heated at 2350° F. for 12 hours. The furnace temperature was then decreased to 2200° F. and held at that temperature for 1 hour to equalize the ingot temperatures. The ingots were single-end forged to 2.25 in. square, then hot cut to remove the hot top which was cut into 3 pieces. The pieces were reheated at 2200° F., double-end forged to 1¼-in. square, and then hot cut into two pieces. The two pieces were reheated at 2050° F. and then single end forged to 0.700-in. square with no further re-heats. The bars were cooled in a hot box overnight, then air cooled to room temperature the next day. The bars were annealed at 1150° F. for 5 hours, air cooled, followed by normalizing at 1950° F. for 4 hours and air cooled. The bars were then annealed at 1150° F. for 6 hours and cooled in air.

Longitudinal smooth tensile samples, longitudinal Charpy V-notch (CVN) impact test samples, longitudinal rising step load (RSL) fracture toughness samples, corrosion cone samples, and potentiodynamic corrosion samples were machined from the 0.700" square forged bars from each heat. The samples were heat treated as follows.

Heat Treatment A—Three of the tensile samples, three of the CVN samples, the five RSL samples, the four corrosion cones, and the two potentiodynamic samples from each heat were preheated at 800° F. for 15 minutes in air. The samples were austenitized at 1975° F. for one hour and oil quenched.

Heat Treatment B—Three other tensile samples and three other CVN samples from each heat were preheated at 800° F. for 15 minutes in a vacuum furnace. The furnace temperature was raised to 1975° F. The samples were held at that temperature for 1 hour and then quenched under a subatmospheric pressure (vacuum) of 2 bar.

After quenching, all the test samples were refrigerated at −100° F. for 1 hour and then warmed in air. All the samples were then tempered at 400° F. for 3 hours in air, followed by air cooling. The samples were finish machined prior to testing to remove any surface oxide or carburization.

Shown in Table 2 are the results of room temperature tensile testing including the 0.2% offset yield strength (Y.S.) and the ultimate tensile strength (U.T.S.) in ksi, the percent elongation (% El.), and the percent reduction in area (% R.A.)

TABLE 2

| Ht. No. | Heat Treatment | Y.S. | U.T.S. | % El. | % R.A. |
|---|---|---|---|---|---|
| 780 | A | 187 | 263 | 13.7 | 48.4 |
|  |  | 184 | 261 | 13.6 | 47.5 |
|  |  | 184 | 261 | 14.4 | 49.0 |
|  | Avg. | 185 | 262 | 13.9 | 48.3 |
|  | B | 191 | 266 | 13.2 | 44.2 |
|  |  | 189 | 265 | 13.4 | 46.8 |
|  |  | 190 | 265 | 14.2 | 49.0 |
|  | Avg. | 190 | 265 | 13.6 | 46.7 |
| 781 | A | 191 | 265 | 13.9 | 50.3 |
|  |  | 186 | 262 | 13.7 | 48.5 |
|  |  | 189 | 265 | 13.6 | 46.3 |
|  | Avg. | 189 | 264 | 13.7 | 48.4 |
|  | B | 192 | 267 | 14.0 | 45.6 |
|  |  | 188 | 267 | 14.2 | 49.1 |
|  |  | 191 | 268 | 14.3 | 51.8 |
|  | Avg. | 190 | 267 | 14.2 | 48.8 |
| 782 | A | 199 | 280 | 14.0 | 45.9 |
|  |  | 199 | 281 | 13.9 | 46.4 |
|  |  | 199 | 278 | 14.3 | 46.4 |
|  | Avg. | 199 | 280 | 14.1 | 46.2 |
|  | B | 200 | 282 | 14.7 | 46.3 |
|  |  | 200 | 282 | 14.6 | 43.2 |
|  |  | 203 | 281 | 14.0 | 42.3 |
|  | Avg. | 201 | 282 | 14.4 | 43.9 |

Shown in Table 3 are the results of room temperature toughness testing on the sets of triplicate test samples. The toughness testing was performed in accordance with ASTM Standard Test Procedure E 23. The data include the individual CVN impact energies (CVN IE) in ft-lbs for each sample and the averages for each set of triplicate test samples.

TABLE 3

| Ht. No. | Heat Treatment | CVN IE | | | Avg. |
|---|---|---|---|---|---|
| 780 | A | 25.8 | 27.2 | 26.2 | 26.5 |
|  | B | 26.0 | 26.5 | 26.7 | 26.5 |
| 781 | A | 23.6 | 23.7 | 21.4 | 23.0 |
|  | B | 23.7 | 21.1 | 22.2 | 22.5 |
| 782 | A | 23.9 | 24.6 | 17.3 | 22.0 |
|  | B | 22.6 | 22.6 | 23.4 | 23.0 |

The results of room temperature fracture toughness testing ($K_{Ic}$) and stress corrosion cracking testing ($K_{Iscc}$) are presented in Table 4 below including individual and final $K_{Ic}$ values and individual and final $K_{Iscc}$ values in ksi√in. Fracture toughness testing was performed in accordance with ASTM Standard Test Procedure E1290. The stress corrosion cracking testing was performed in accordance with ASTM Standard Test Procedure F1624. The $K_{Iscc}$ testing was conducted for a 1-hour step (1H) and then with a 2-hour step (2H).

TABLE 4

| Ht. No. | Environment | Test | $K_{Ic}/K_{Iscc}$ | | Final |
|---|---|---|---|---|---|
| 780 | Air | $K_{Ic}$ | 100.1 | 100.7 | 100 |
|  | 3.5% NaCl | $K_{Iscc}$ | 41.4 (1H) | 41.9 (2H) | 41 |
| 781 | Air | $K_{Ic}$ | 96.9 | 95.1 | 96 |
|  | 3.5% NaCl | $K_{Iscc}$ | 42.1 (1H) | 50.8 (2H) | 42 |
| 782 | Air | $K_{Ic}$ | 83.8 | 84.6 | 84 |
|  | 3.5% NaCl | $K_{Iscc}$ | 29.6 (1H) | 26.6 (2H) | 27 |

Salt spray corrosion testing was performed on quadruplicate polished cone samples from all heats. Samples were tested in accordance with ASTM Standard Test Procedure B 117, using a 5% NaCl concentration, natural pH, at 95° F. with a 200-hour test duration. The results of the salt spray test are shown in Table 5 below including the time to first appearance of rust on a specimen surface and a rating based on visual comparison of the tested specimens. (1=no rust, 2=1 to 3 spots of rust, 3=<5% of surface rusted, 4=5-10% of surface rusted, and 5=10-20% of the surface rusted.)

TABLE 5

| Ht. No. | Time to First Rust | Final Rating |
|---|---|---|
| 780 | None, None, None, None | 1, 1, 1, 1 |
| 781 | None, None, None, None | 1, 1, 1, 1 |
| 782 | None, None, None, None | 1, 1, 1, 1 |

Duplicate cyclic polarization samples were tested in a 3.5% NaCl solution, natural pH, at room temperature to determine pitting potential in accordance with ASTM standard test procedure G61. All testing was performed with complete reversals to determine whether the samples would re-passivate and show a protection potential. The results of the cyclic polarization (pitting potential) test are set forth in Table 6 below including the pitting potential in millivolts (mV) as measured at the knee of the curve plotted by the testing apparatus, the average of the two values, and the Protection Potential in mV.

TABLE 6

| Ht. No. | Pitting Potential | Avg. | Protection Potential |
|---|---|---|---|
| 780 | 130.3, 143.3 | 137 | None |
| 781 | 182.8, 182.2 | 182 | None |
| 782 | 118.2, 113.3 | 116 | None |

Example 2—High Nitrogen

Large, mill-scale heats were produced to provide examples containing more than 0.15% nitrogen. The average weight percent compositions of the two heats are presented in Table 7 below.

TABLE 7

| Elmt. | Ht. 573 | Ht. 928 | Ht. 487 |
|---|---|---|---|
| C | 0.23 | 0.27 | 0.23 |
| Mn | 0.56 | 0.55 | 0.57 |
| Si | 1.21 | 1.07 | 0.95 |
| P | 0.003 | 0.003 | 0.001 |
| S | 0.002 | 0.002 | 0.001 |
| Cr | 10.07 | 10.07 | 10.13 |
| Ni | 3.57 | 3.57 | 3.57 |
| Mo | 1.54 | 1.57 | 1.54 |
| Cu | 0.51 | 0.51 | 0.51 |
| Co | 2.56 | 2.52 | 2.56 |
| V | 0.25 | 0.25 | 0.25 |
| Ti | 0.013 | 0.024 | <0.01 |
| Al | 0.016 | 0.014 | 0.024 |
| Nb | <0.01 | <0.01 | <0.01 |
| N | 0.21 | 0.24 | 0.21 |

The balance of each alloy was iron and usual impurities including less than 0.0015% oxygen.

The heats were vacuum induction melted and cast as 14-inch electrode ingots for remelting. The electrode ingots were refined by electroslag remelting under a superatmospheric pressure of nitrogen to form 17-inch diameter ingots. The PESR ingots were hot worked from a start temperature of 2200° F. to produce 4.75-inch round bars. The bars were heated at 1950° F. (1066° C.) for 4 hours, air cooled, and then annealed at 1150° F. (620° C.) for 8 hours and cooled in air.

Longitudinal and transverse tensile samples, longitudinal Charpy V-notch (CVN) impact samples, longitudinal rising step load (RSL) fracture toughness samples were machined from the forged bar of Heat 573. The tensile specimens were obtained from mid-radius and center locations of the bars. Longitudinal tensile samples were machined from the mid-radius portion of the forged bar of Heat 928. The samples were heat treated as follows.

Heat Treatment A—Solution anneal (austenitize) at 1950° F. for one hour and oil quench. Deep chill at −100° F. for 8 hours and then warm in air. Temper at 400° F. for 3 hours followed by cooling in air.

Heat Treatment B—Austenitize at 1950° F. for one hour in a vacuum furnace and quench in a subatmospheric pressure of 2 bar. Deep chill at −100° F. for 8 hours and then warm in air. Temper at 400° F. for 3 hours followed by cooling in air.

Heat Treatment C—Austenitize at 1950° F. for one hour and oil quench. Deep chill at −100° F. for 8 hours and then warm in air. Temper at 400° F. for 2 hours followed by cooling in air.

Heat Treatment D—Austenitize at 1950° F. for one hour and oil quench. Deep chill at −100° F. for 8 hours and then warm in air. Temper at 450° F. for 3 hours followed by cooling in air.

Heat Treatment E—Austenitize at 1900° F. for one hour and oil quench. Deep chill at −100° F. for 8 hours and then warm in air. Temper at 400° F. for 3 hours followed by cooling in air.

Heat Treatment F—Austenitize at 1900° F. for one hour and oil quench. Deep chill at −100° F. for 8 hours and then warm in air. Temper at 400° F. for 2 hours followed by cooling in air.

Heat Treatment G—Austenitize at 1900° F. for one hour and oil quench. Deep chill at −100° F. for 8 hours and then warm in air. Temper at 450° F. for 3 hours followed by cooling in air.

Shown in Table 8 are the results of room temperature tensile testing including the 0.2% offset yield strength (Y.S.) and the ultimate tensile strength (U.T.S.) in ksi, the percent elongation (% El.), and the percent reduction in area (% R.A.) for the tested samples of Heats 573 and 928. "Location" refers to the portion of the ingot from which the test samples were cut.

TABLE 8

| Ht. No. | Orientation | Location | Heat Treatment | Y.S. | U.T.S. | % El. | % R.A. |
|---|---|---|---|---|---|---|---|
| 573 | Transverse | Top End | A | 201 | 287 | 14.2 | 21.85 |
|  |  | Bottom End |  | 201 | 279 | 4.8 | 4.35 |
|  | Longitudinal | Mid-Radius |  |  |  |  |  |
|  |  | Top End | A | 204 | 288 | 17.3 | 40.2 |
|  |  | Bottom End |  | 202 | 289 | 17 | 36.3 |
|  |  | Top End | B | 208 | 289 | 17.2 | 40.8 |
|  |  | Bottom End |  | 203 | 289 | 18.3 | 39.4 |
|  |  | Center[1] |  |  |  |  |  |
|  |  | Top End | A | 204 | 287 | 17.2 | 39.4 |
|  |  | Bottom End |  | 202 | 288 | 17.7 | 43 |
| 928 | Longitudinal | Mid-Radius |  |  |  |  |  |
|  |  | Top End | A | 204 | 288 | 17.2 | 45.8 |
|  |  |  | C | 205.5 | 290.5 | 17.4 | 45.2 |
|  |  |  | D | 197.5 | 279 | 17 | 47.6 |
|  |  |  | E | 202.5 | 286 | 17 | 45.2 |
|  |  |  | F | 205.5 | 286 | 16.7 | 44.3 |
|  |  |  | G | 202 | 280.5 | 17.5 | 47.9 |
| 487 | Transverse | Center[1] |  |  |  |  |  |
|  |  | Top End | A | 199 | 285 | 12 | 20 |
|  |  | Middle[2] | A | 199 | 283 | 15 | 30 |
|  |  | Bottom End | A | 196 | 275 | 4.7 | 6.5 |
|  | Longitudinal | Mid-Radius |  |  |  |  |  |
|  |  | Top End | A | 203 | 290 | 14 | 12 |
|  |  | Middle[2] | A | 195 | 288 | 14 | 25 |
|  |  | Bottom End | A | 201 | 289 | 12 | 26 |
|  | Longitudinal | Center[1] |  |  |  |  |  |
|  |  | Top End | A | 195 | 283 | 11 | 14 |
|  |  | Middle[2] | A | 202 | 289 | 12 | 20 |
|  |  | Bottom End | A | 195 | 283 | 11 | 14 |

[1]Center = mid-diameter of the ingot
[2]Middle = mid-length of the ingot

In the results for Heat 573, the transverse values are the averages of duplicate test samples; the longitudinal values for the mid-radius samples are the averages of eight test samples; and the longitudinal values for the center samples and for the vacuum-cooled, mid-radius samples are the averages of quadruplicate test samples. In the results for Heat 928, the values are averages of duplicate test samples.

Set forth in Table 9 below are the results of room temperature Charpy V-notch impact testing on standard test specimens prepared from the bar material of Heats 573 and 487. The test specimens were heat treated in accordance with Heat Treatment A. The data in Table 9 include the location identification, the test temperature in ° F., and the impact energy in ft-lbs.

TABLE 9

| Heat No. | Loc. | Test ID | Test Temp. | CVN IE |
|---|---|---|---|---|
| 573 | Top End | 1 | 66.9 | 16.7 |
|  |  | 2 | 67.1 | 15.7 |
|  |  | 3 | 67.3 | 14.4 |
|  |  | 4 | 67.5 | 17.5 |
|  |  | 5 | 67.6 | 16.8 |
|  |  | 6 | 67.6 | 16.9 |
|  |  | 7 | 67.5 | 16.3 |
|  |  | 8 | 67.3 | 16.4 |
|  |  | Avg. |  | 16.3 |
|  | Bottom End | 1 | 67.1 | 9.2 |
|  |  | 2 | 67.1 | 9.3 |
|  |  | 3 | 67.2 | 12.7 |
|  |  | 4 | 67.3 | 13.6 |
|  |  | 5 | 66.9 | 7.2 |
|  |  | 6 | 66.9 | 9.5 |
|  |  | 7 | 66.7 | 12.4 |
|  |  | 8 | 66.8 | 13.5 |
|  |  | Avg. |  | 10.9 |
| 487 | Top End |  | 68 | 12.5 |
|  | Center[1] |  | 68 | 8.0 |
|  | Bottom End |  | 68 | 8.5 |

TABLE 9-continued

| Heat No. | Loc. | Test ID | Test Temp. | CVN IE |
|---|---|---|---|---|
|  | Top End |  | −22 | 7.5 |
|  | Center[1] |  | −22 | 6.0 |
|  | Bottom End |  | −22 | 6.0 |

[1]Center = mid-length of the ingot

Set forth in Table 10 below are the results of room temperature fracture toughness testing of specimens prepared from the bar material of Heats 573 and 487 including the $K_{Ic}$ fracture toughness in ksi√in. The test specimens were heat treated in accordance with Heat Treatment A prior to testing.

TABLE 10

| Ht. No. | Loc. | Test ID | $K_{Ic}$ |
|---|---|---|---|
| 573 | Top End | 1 | 44.1 |
|  |  | 2 | 42.9 |
|  |  | Avg. | 43.5 |
|  | Bottom End | 1 | 40.9 |
|  |  | 2 | 38.8 |
|  |  | Avg. | 39.9 |
| 487 | Top End |  | 47.7 |
|  | Center[1] |  | 42.6 |
|  | Bottom End |  | 43.4 |

[1]Center = mid-length of the ingot

Salt spray corrosion testing was performed on quadruplicate polished cone samples prepared from Heat 573. The samples were heat treated using Heat Treatment A and were tested in accordance with ASTM Standard Test Procedure B 117 as described above. The results of the salt spray test are shown in Table 11 below including the time to first appearance of rust on a specimen surface and a rating based on visual comparison of the tested specimens. (1=no rust, 2=1 to 3 spots of rust, 3=<5% of surface rusted, 4=5-10% of surface rusted, and 5=10-20% of the surface rusted.)

TABLE 11

| Sample Loc. | Time to First Rust | Final Rating |
|---|---|---|
| Top End | None, None, 48 hrs, 168 hrs | 1, 1, 2, 2 |
| Bottom End | None, None, None, None | 1, 1, 1, 1 |

Figure 1:
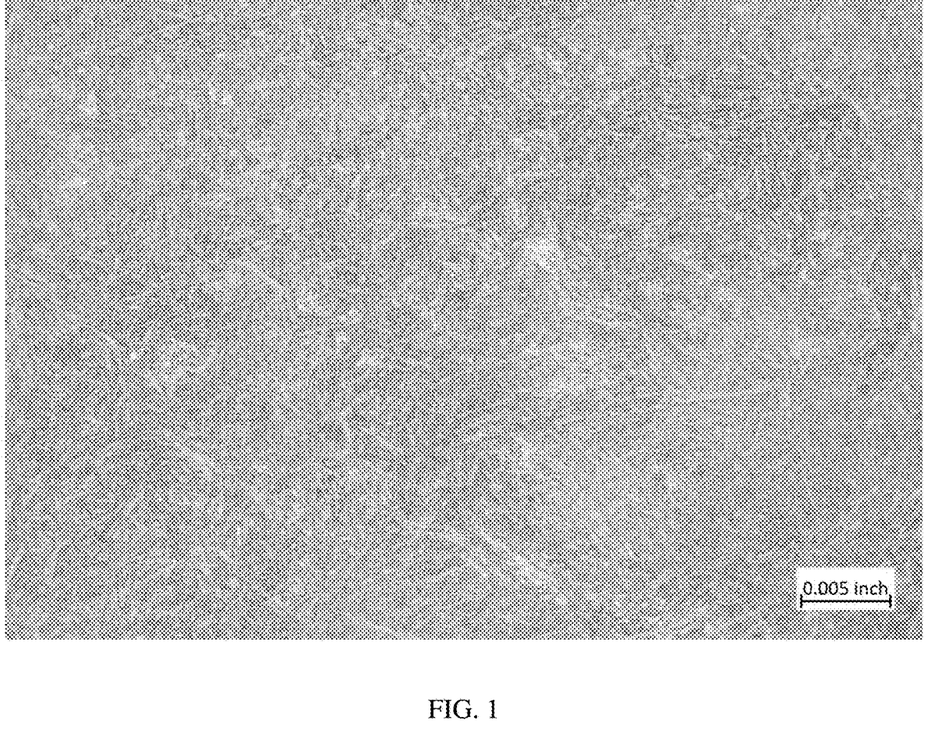
FIG. 1 is a photomicrograph taken at a magnification of 100× of a sample of material taken from the top end of Heat 487 after quenching in oil.
Figure 2:
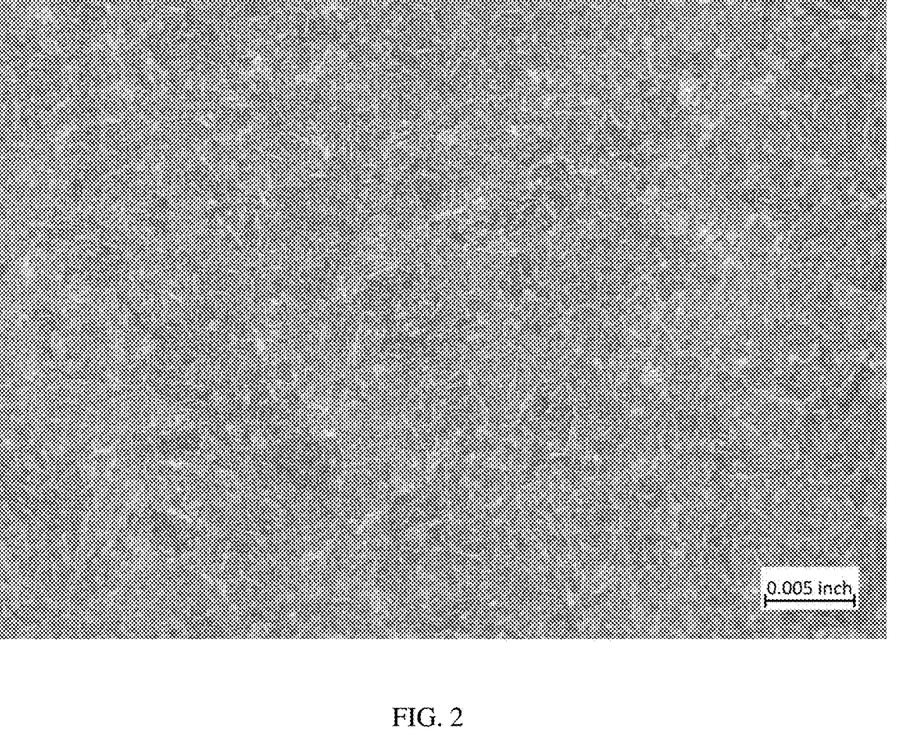
FIG. 2 is a photomicrograph taken at a magnification of 100× of a sample of material taken from the top end of Heat 487 after air cooling.
Figure 3:
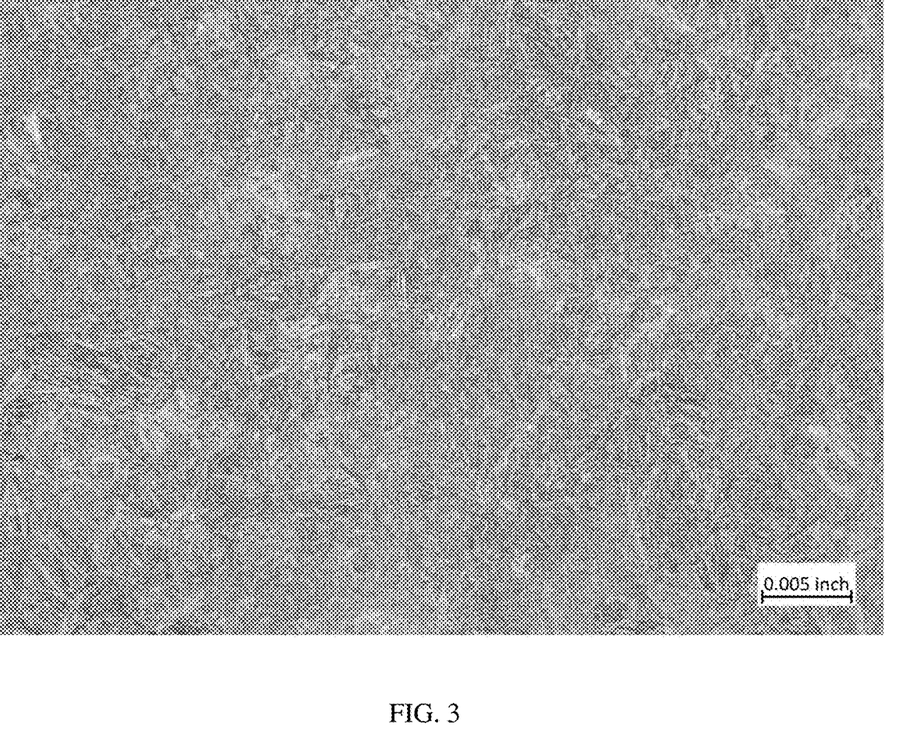
FIG. 3 is a photomicrograph taken at a magnification of 100× of a sample of material taken from the middle portion of Heat 487 after quenching in oil.
Figure 4:
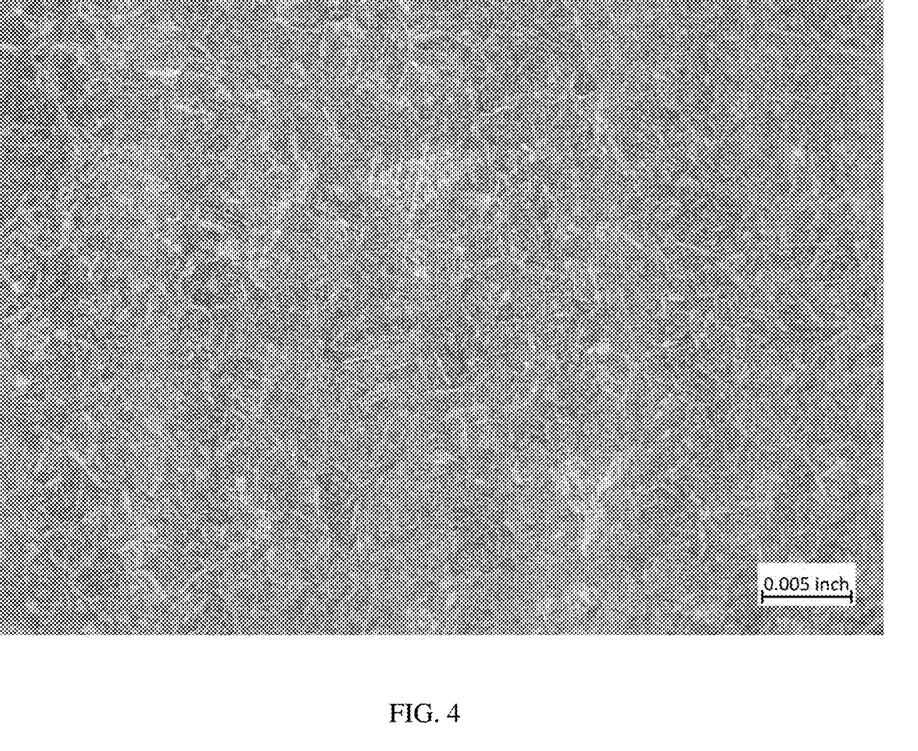
FIG. 4 is a photomicrograph taken at a magnification of 100× of a sample of material taken from the middle portion of Heat 487 after air cooling.
Figure 5:
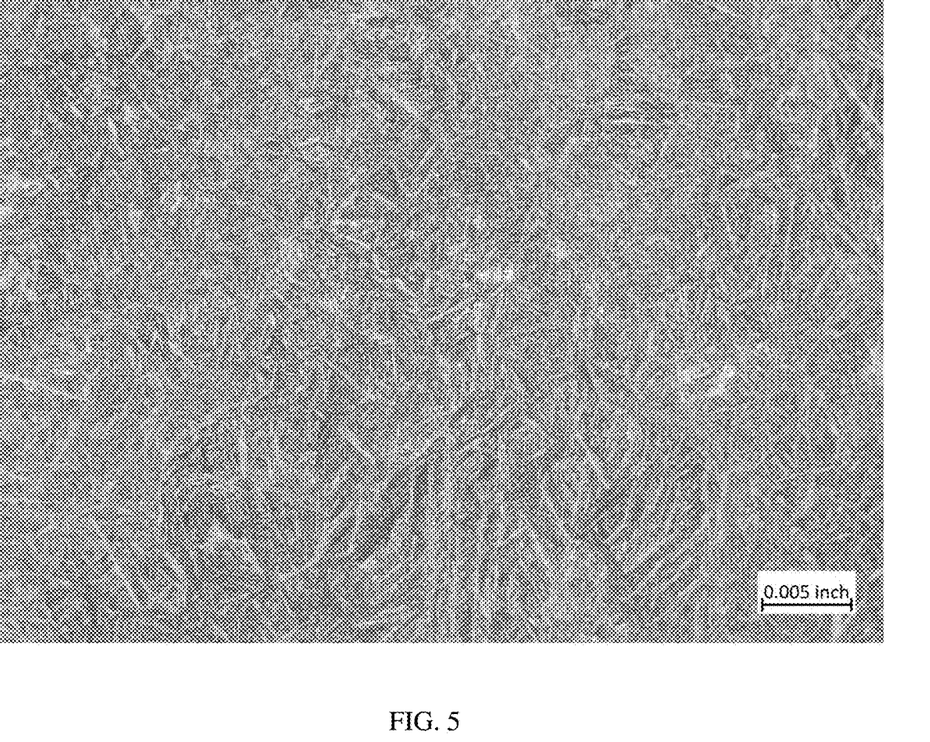
FIG. 5 is a photomicrograph taken at a magnification of 100× of a sample of material taken from the bottom end of Heat 487 after quenching in oil.
Figure 6:
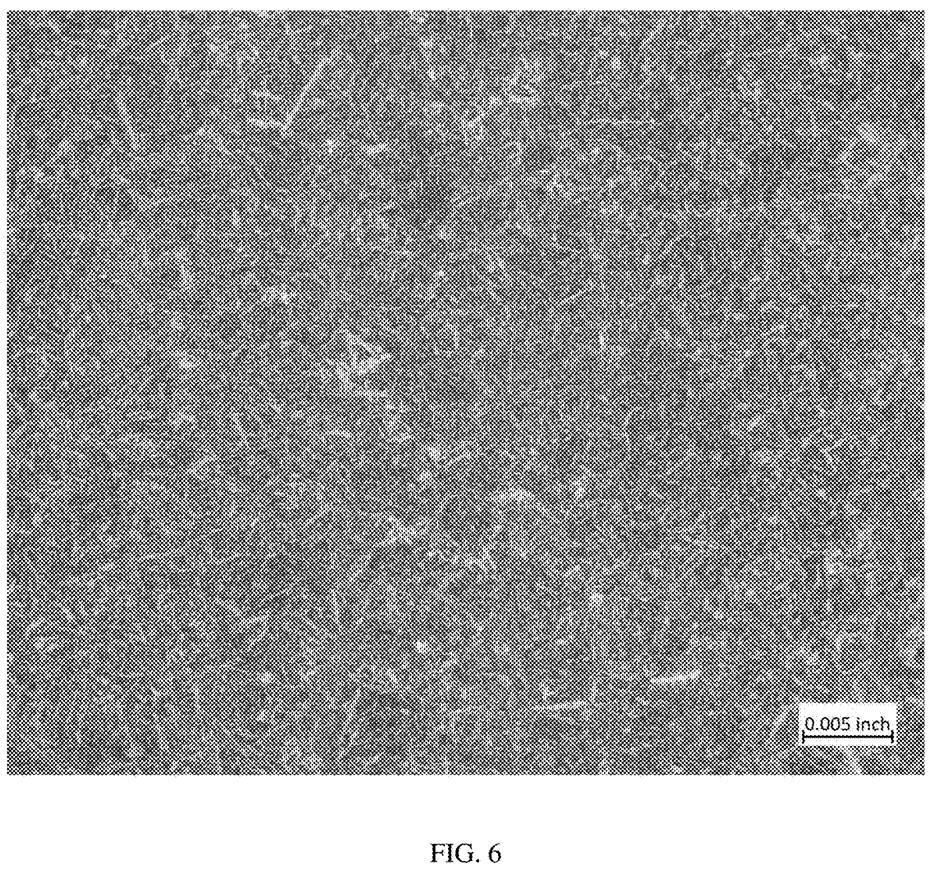
FIG. 6 is a photomicrograph taken at a magnification of 100× of a sample of material taken from the top end of Heat 487 after air cooling.

A comparison of the photomicrographs of FIGS. 1-6 shows that there is no visible evidence of grain boundary carbides in the more slowly cooled (gas quenched) samples shown in FIGS. 2, 4, and 6 compared to the oil-quenched samples shown in FIGS. 1, 3, and 5.

The terms and expressions which are employed in this specification are used as terms of description and not of limitation. There is no intention in the use of such terms and expressions of excluding any equivalents of the features shown and described or portions thereof. It is recognized that various modifications are possible within the invention described and claimed herein.

The invention claimed is:

1. A steel alloy consisting essentially of, in weight percent, about:

| | |
|---|---|
| C | 0.15-0.3 |
| Mn | 0.1-1.0 |
| Si | 0.1-1.2 |
| Cr | 9.0-12.5 |
| Ni | 3.0-4.3 |
| Mo | 1-2 |
| Cu | 0.1-1.0 |
| Co | 1-4 |
| W | 0.02 max. |
| V | 0.1-0.6 |
| Ti | 0.02 max. |
| Al | 0-0.25 |
| Nb | 0-0.01 |
| Ta | 0-0.01 |
| N | 0.15-0.35 |
| Ce | 0.006 max. |
| La | 0.006 max. | the balance of the alloy is iron and impurities, wherein the impurities include not more than about 0.01% phosphorus and not more than about 0.001% sulfur.

2. The alloy as set forth in claim 1 in which titanium is not more than about 0.01%.

3. The alloy as set forth in claim 1 in which nitrogen is not more than about 0.30%.

4. The alloy set forth in claim 1 in which chromium is at least about 9.5%.

5. The alloy set forth in claim 1 in which molybdenum is about 1.25-1.75%.

6. The alloy set forth in claim 1 in which cobalt is about 2-3%.

7. The alloy set forth in claim 1 in which nickel is at least about 3.2%.

8. The alloy as set forth in claim 1 in which vanadium is not more than about 0.5%.

9. The alloy as set forth in claim 1 wherein C+N is about 0.3-0.6%.

10. The alloy as set forth in claim 1 in which copper is not more than about 0.7%.

11. A steel alloy consisting essentially of, in weight percent, about

| | |
|---|---|
| C | 0.15-0.3 |
| Mn | 0.1-0.7 |
| Si | 0.5-1.2 |
| Cr | 9.5-12.5 |
| Ni | 3.2-4.3 |
| Mo | 1.25-1.75 |
| Cu | 0.1-0.7 |
| Co | 2-3 |
| W | 0.1 max. |
| V | 0.1-0.5 |
| Ti | 0.01 max. |
| Nb | up to 0.01 |
| Ta | up to 0.01 |
| Al | 0.25 max. |
| N | 0.15-0.30 |
| Ce | 0-0.006 |
| La | 0-0.005 | and the balance is iron and impurities, wherein the impurities include not more than about 0.005% phosphorus and not more than about 0.001% sulfur.

12. The alloy as set forth in claim 11 in which copper is at least about 0.3% copper.

13. A quenched and tempered steel article made from the alloy set forth in claim 1 which has a tensile strength of at least 280 ksi.

14. The steel article set forth in claim 13 which has a fracture toughness ($K_{Ic}$) of at least about 65 ksi√in when tested in accordance with ASTM Standard Test Procedure E1290.

15. The steel article set forth in claim 14 which has general corrosion resistance characterized by the article not having rust after 200 hours when tested in accordance with ASTM Standard Test Procedure B 117.

16. The steel article as set forth in claim 14 which has pitting corrosion resistance characterized by the article having a pitting potential of at least 90 mV when tested in accordance with ASTM Standard Test procedure G61 modified by using round bar samples.

17. A structural component for an aerospace vehicle wherein the component is made from an alloy consisting essentially of, in weight percent, about

| | |
|---|---|
| C | 0.15-0.3 |
| Mn | 0.1-0.7 |
| Si | 0.5-1.2 |
| Cr | 9.5-12.5 |
| Ni | 3.2-4.3 |
| Mo | 1.25-1.75 |
| Cu | 0.1-0.7 |
| Co | 2-3 |
| W | 0.1 max. |
| V | 0.1-0.5 |
| Ti | 0.01 max. |
| Nb | 0.01 max. |
| Ta | 0.01 max. |
| Al | 0.25 max. |
| N | 0.15-0.30 |
| Ce | 0-0.006 |
| La | 0-0.005 | and the balance is iron and impurities, wherein the impurities include not more than 0.005% phosphorus and not more than 0.0005% sulfur.

18. The aerospace structural component as set forth in claim 17 wherein the component is selected from the group consisting of one or more of landing gear, a rotatable shaft, an actuator, flap tracks, and slat tracks.

* * * * *

UNITED STATES PATENT AND TRADEMARK OFFICE
CERTIFICATE OF CORRECTION

PATENT NO. : 11,634,803 B2
APPLICATION NO. : 16/666700
DATED : April 25, 2023
INVENTOR(S) : David E. Wert et al.

It is certified that error appears in the above-identified patent and that said Letters Patent is hereby corrected as shown below:

On the Title Page

Column 1, delete the following text:
"Related U.S. Application Data:
(63) Continuation-in part of application No. 15/235,226, filed on Aug. 12, 2016, now Pat. No. 10,458,007, which is a continuation of application No. 14/061,845, filed on Oct. 24, 2013, now abandoned.
(60) Provisional application No. 61/717,877, filed Oct. 24, 2012."

Signed and Sealed this
Ninth Day of April, 2024

Katherine Kelly Vidal
*Director of the United States Patent and Trademark Office*